United States Patent [19]

Janda et al.

[11] Patent Number: 4,727,971
[45] Date of Patent: Mar. 1, 1988

[54] PRESSURE PLATE UNIT FOR A FRICTION CLUTCH

[75] Inventors: Peter Janda, Sennfeld; Alfred Schraut, Waigolshausen; Günther Rostin, Dittelbrunn, all of Fed. Rep. of Germany

[73] Assignee: Fichtel & Sachs AG, Fed. Rep. of Germany

[21] Appl. No.: 732,366

[22] Filed: May 9, 1985

[30] Foreign Application Priority Data

May 10, 1984 [DE] Fed. Rep. of Germany ....... 3417224

[51] Int. Cl.$^4$ .............................................. F16D 13/50
[52] U.S. Cl. ................................. 192/70.27; 192/89 B
[58] Field of Search ........................... 192/70.27, 89 B

[56] References Cited

U.S. PATENT DOCUMENTS

| | | | |
|---|---|---|---|
| 2,002,943 | 5/1935 | Hartley | 192/70.27 X |
| 2,222,508 | 11/1940 | Hunt | 192/70.27 |
| 2,256,714 | 9/1941 | Hunt | 192/70.27 |
| 3,306,407 | 2/1967 | Smirl | 192/89 B X |
| 3,385,409 | 5/1968 | Smirl | 192/89 B X |
| 3,499,512 | 3/1970 | Maurice | 192/89 B |
| 3,595,355 | 7/1971 | Maucher et al. | 192/70.27 |
| 3,630,333 | 12/1971 | Schiefer et al. | 192/89 B X |
| 3,739,896 | 6/1973 | Shono | 192/70.27 |
| 4,241,820 | 12/1980 | Ban et al. | 192/89 B |
| 4,425,991 | 1/1984 | Hays | 192/70.27 |

FOREIGN PATENT DOCUMENTS

| | | |
|---|---|---|
| 1068568 | 11/1959 | Fed. Rep. of Germany ... 192/70.27 |
| 2207320 | 8/1972 | Fed. Rep. of Germany ... 192/70.27 |
| 2149317 | 4/1973 | Fed. Rep. of Germany ... 192/70.27 |
| 2157199 | 5/1973 | Fed. Rep. of Germany . |
| 994283 | 6/1965 | United Kingdom . |
| 1115729 | 5/1968 | United Kingdom . |
| 1393968 | 4/1975 | United Kingdom . |
| 2131515 | 6/1984 | United Kingdom . |
| 2149463 | 11/1984 | United Kingdom . |
| 2145170 | 3/1985 | United Kingdom . |

Primary Examiner—Leslie Braun
Assistant Examiner—Dwight G. Diehl
Attorney, Agent, or Firm—Toren, McGeady & Associates

[57] ABSTRACT

A pressure plate unit for a pulled-type friction clutch comprises a presser plate which is connected with the diaphragm spring through retaining elements to ensure the disengagement action. The retaining elements extend substantially radially within a circle along which the pressure plate rests on the diaphragm spring. The retaining elements are secured non-rotatably in relation to the presser plate and the diaphragm spring. Different retaining elements are proposed. Distance bolts screwed into the presser plate with leaf spring elements can be used. Likewise U-shaped springs can be used which are hooked into radial openings of a bead of the presser plate. Furthermore the retaining elements can be secured on the diaphragm spring or an additional ring and locked with the pressure plate by means of a circumferential groove of the bead.

1 Claim, 11 Drawing Figures

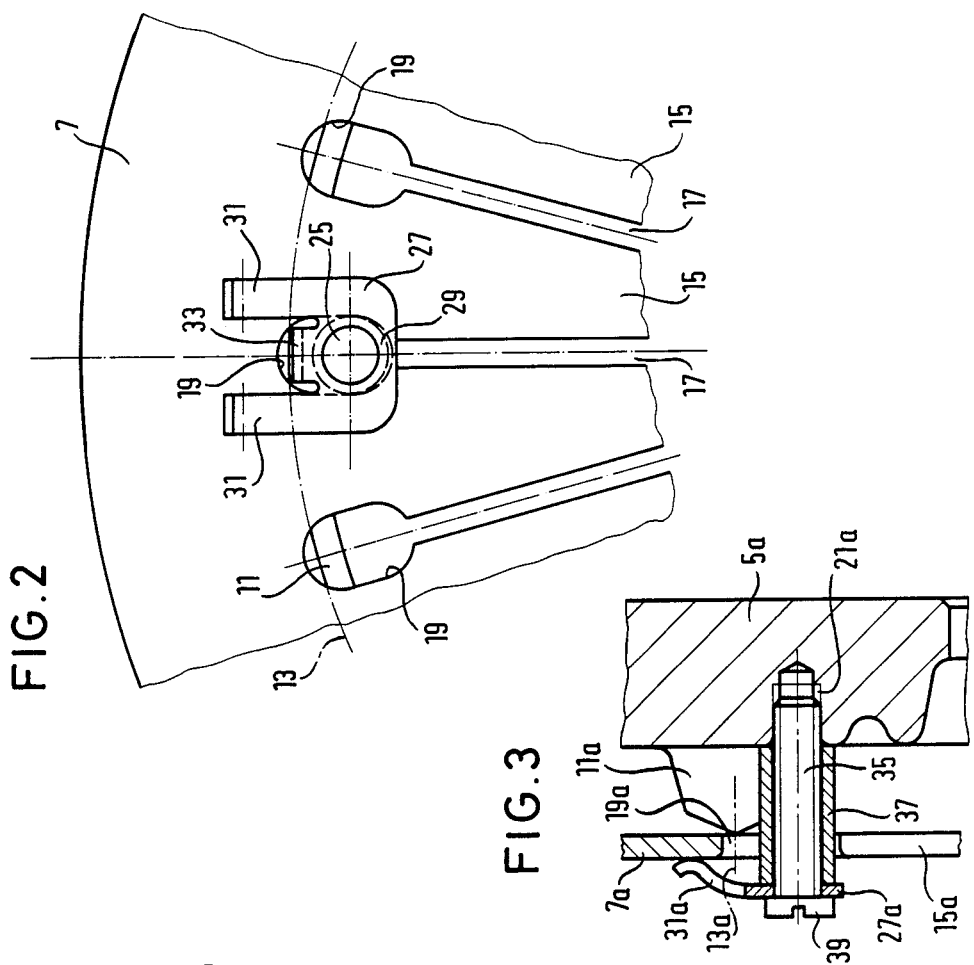
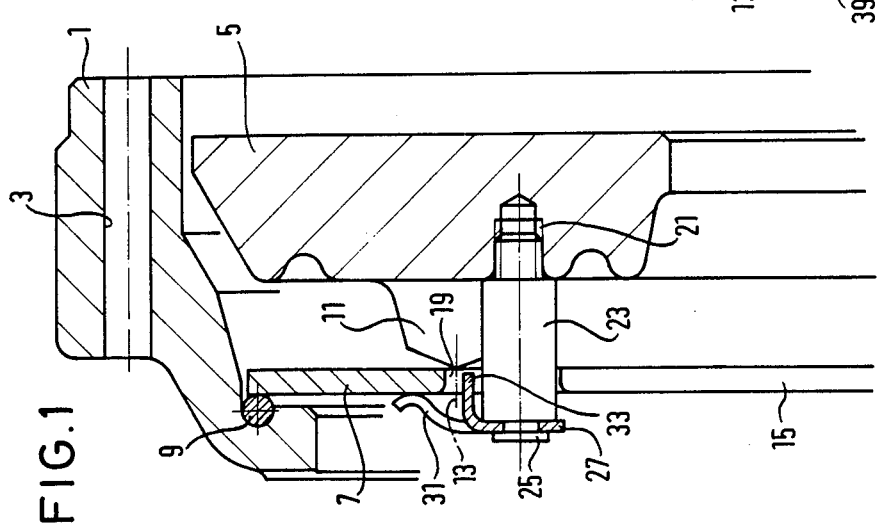

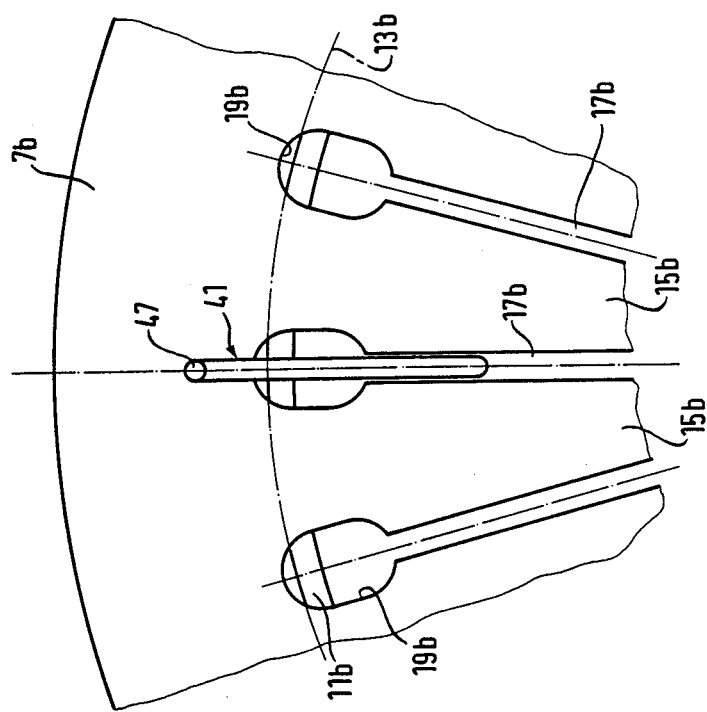
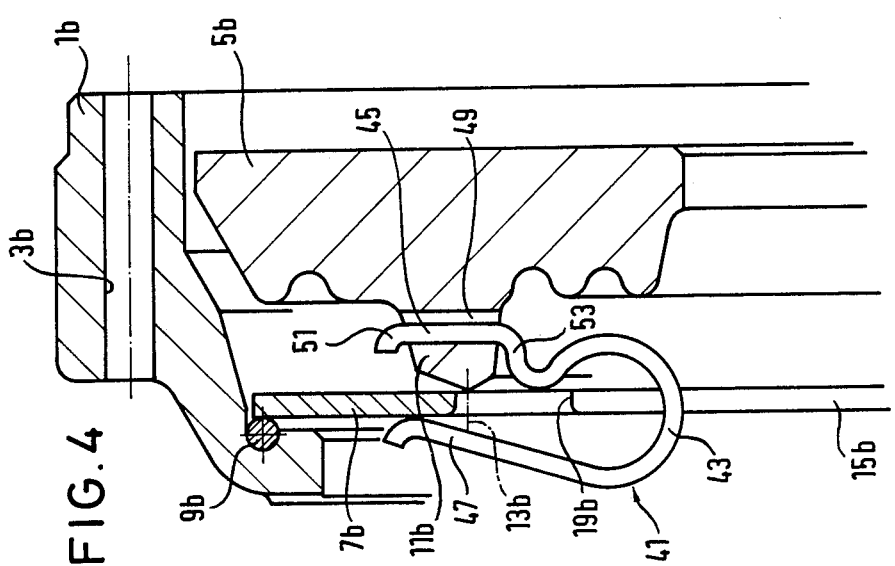

PRESSURE PLATE UNIT FOR A FRICTION CLUTCH

BACKGROUND OF THE INVENTION

The invention relates to a pressure plate unit for a pulled-type friction clutch, particularly of a motor vehicle.

In a pulled-type friction clutch in which the pressure application force is generated by a diaphragm spring, the clutch is released in that clutch fingers are pulled in the axial direction away from a clutch disc, clamped in between a flywheel and a presser plate of the clutch, by means of a release member. The diaphragm spring is supported along its external circumference on a clutch cover and radially within its external circumference along a circle of application to the presser plate.

In order to ensure that the presser plate lifts away from the clutch disc in the release of the clutch, the presser plate and the diaphragm spring are secured to one another in the region of the circle of application, in a pulled-type clutch known from German Publication Specification No. 2,157,199. For securing there is provided a plurality of loose retaining elements which partially engage radially within the circle of application and partially outside the circle of application, through holes in the diaphragm spring and are detained on the presser plate.

In the known clutch the retaining elements can twist more or less greatly in the holes of the diaphragm spring, in relation to the diaphragm spring, by reason of the irregular loading of the clutch by the internal combustion engine of the motor vehicle. This increases the wear of the retaining elements.

OBJECT OF THE INVENTION

The invention is directed to indicate a way in which the life of the retaining elements can be lengthened in a constructionally simple manner. Furthermore it should be easy to fit the diaphragm spring and the presser plate to one another and conventional diaphragm springs are to be usable.

SUMMARY OF THE INVENTION

According to the invention the retaining elements which connect the diaphragm spring with the presser plate are fixed non-rotatably either to the diaphragm spring or to the presser plate, or possibly even to both elements. In this connection by non-rotatable fixing there is to be understood a fixing or guidance in relation to an axis parallel to the axis of rotation of the presser plate or the diaphragm spring.

In a first preferred embodiment the retaining elements are secured separately from one another to the presser plate. The retaining elements are formed as threaded bolts which are screwed into axial threaded openings of the presser plate and pass through holes in the diaphragm spring. On the side of the threaded bolts remote from the presser plate, leaf spring elements are riveted to the threaded bolts or are screwed by means of the threaded bolts against distance sleeves. The leaf spring elements stress the diaphragm spring against the presser plate. The holes provided for the passage of the threaded bolts are preferably the end holes between adjacent release tongues of the diaphragm spring.

In a second preferred embodiment the retaining elements are formed as U-shaped springs bent from wire. While one of the two legs of each U-spring is seated in a radial opening of the presser plate, the other leg lies on the side axially remote from the presser plate against the diaphragm spring and stresses the diaphragm spring against the presser plate. The cross-piece of the U-spring passes through the slot between adjacent release tongues, so that the U-spring is likewise fixed non-rotatably.

In further embodiments the presser plate is provided with a groove open radially inwards to the axis of rotation. The retaining elements are connected with one another either through a separate ring or through the diaphragm spring into one unit and engage in the groove. The presser plate has additional apertures arranged at a distance from the retaining elements by means of which the retaining elements can be introduced into the groove by rotation of the diaphragm spring in relation to the presser plate.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

FIG. 1 shows a partial axial longitudinal section through a pressure plate unit for a motor vehicle friction clutch, the diaphragm spring of which is connected through threaded bolts with a presser plate;

FIG. 2 shows a partial axial elevation of the pressure plate unit according to FIG. 1, with the clutch cover removed;

FIG. 3 shows an axial longitudinal section through a detail of a variant of the pressure plate unit according to FIG. 1;

FIG. 4 shows a partial axial longitudinal section through another pressure plate unit for a motor vehicle friction clutch, the diaphragm spring of which is connected through a U-shaped wire spring with a presser plate;

FIG. 5 shows a partial axial elevation of the pressure plate unit according to FIG. 4 with the clutch cover removed;

DETAIL DESCRIPTION OF THE DRAWINGS

Figure 7:
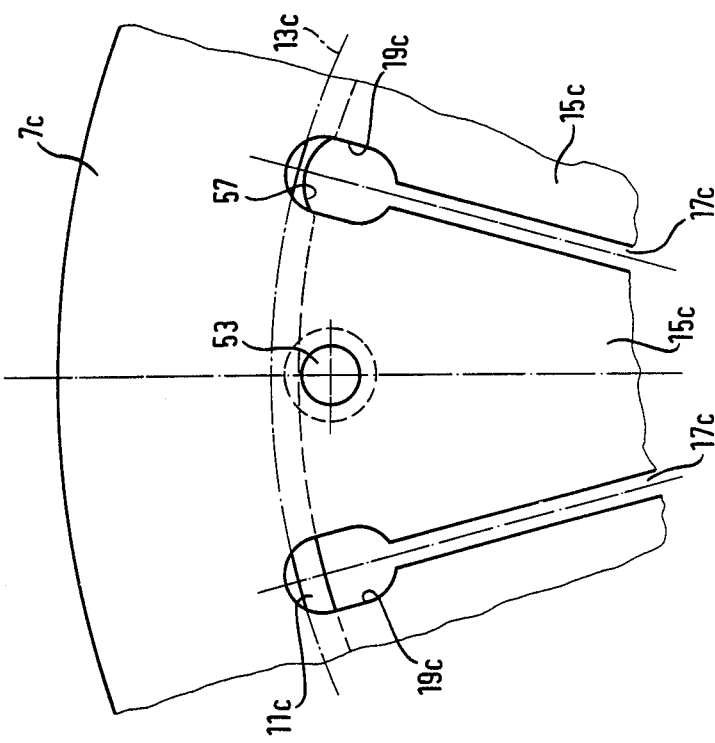
FIG. 7 shows a partial axial elevation of the pressure plate unit according to FIG. 6 with the clutch cover removed.

FIGS. 1 and 2 show a pressure plate unit of a pulled-type motor vehicle friction clutch having a substantially annular clutch cover 1 which is provided with holes 3 for the fastening to a flywheel (not illustrated further) of an internal combustion engine. A presser plate 5 of substantially annular disc form is arranged coaxially with and in the clutch cover 1. Between the presser plate 5 and the flywheel there is arranged in the usual way a clutch disc (not shown) provided with clutch friction linings. A diaphragm spring 7 stresses the presser plate by way of the clutch disc against the flywheel. The diaphragm spring 7 is supported with its external circumference through a support ring 9 on the clutch cover 1, on the side axially remote from the presser plate 5. From the presser plate 5 an annular application bead 11 axially protrudes which abuts along a circle 13 of application on the diaphragm spring 7 in the region of the internal circumference of an annular disc part of the diaphragm spring 7. Release tongues 15 protrude radially inwards from the internal circumference of the annular disc part of the diaphragm spring 7. The release tongues 15 are separated from one another in the circumferential direction by slots 17. The slots 17 end in the region of the internal circumference of the annular disc part of the diaphragm spring 7 and thus in the region of the circle 13 in end holes 19. The end holes 19 are wider in the circumferential direction of the diaphragm spring 7 than the slots 17. The presser plate 5 is conventionally connected non-rotatably but axially displaceably with the clutch cover 1 or the flywheel, for example through tangential straps (not shown further). The application bead 11 can be interrupted in the circumferential direction.

The motor vehicle friction clutch is a pulled-type clutch in which the release tongues 15 are moved axially away from the presser plate 5 and thus the clutch disc for the release of the clutch. In order to ensure that the presser plate 5 follows the release movement of the diaphragm spring 7, distance bolts 23 are screwed into threaded holes 21 of the presser plate 5. The distance bolts 23 are arranged offset in relation to one another in the circumferential direction of the presser plate 5, admittedly FIGS. 1 and 2 show only one of these distance bolts. Each of the distance bolts 23 passes through one of the end holes 19 of the diaphragm spring 7 and carries at its end remote from the presser plate 5 a rivet head 25 which holds a leaf spring element 27 on the distance bolt 23. As FIG. 2 shows, the leaf spring element 27 is of substantially U-form. The rivet head 25 passes through a cross-piece region 29 of the leaf spring element 27. From the cross-piece region 29 two leg regions 31 protrude radially symmetrically in relation to the rivet head 25. The leg regions 31 lie resiliently against the side of the annular disc part of the diaphragm spring 7 axially remote from the presser plate 5 and press the diaphragm spring 7 against the presser plate 5.

The distance bolt 23 is seated non-rotatably in the threaded opening 21 and if desired can be additionally stuck in. In order to prevent twisting of the leaf spring element 27 in relation to the diaphragm spring 7, a tab 33 is bent off axially from the cross-piece region 29 between the two leg regions 31. The tab engages in the end hole 19 and guides the leaf spring element 27 non-rotatably on the diaphragm spring 7. For this purpose the end hole 19 is formed as an elongated hole in the radial direction.

FIG. 3 shows details of a variant of the pressure plate unit according to FIG. 1 which differs only in its retaining elements which secure the diaphragm spring on the presser plate. Parts of like effect are therefore designated in FIG. 3 with the reference numerals of FIG. 1 and additionally provided with the letter a. For further explanation reference is made to the description of FIGS. 1 and 2.

In place of the threaded bolts 23, headed bolts 35 are screwed into the threaded openings 21a of the presser plate 5a and may additionally be stuck. The headed bolts 35 pass through distance sleeves 37 and hold, on the side axially remote from the presser plate 5a between their head 39 and the distance sleeve 37, a leaf spring element 27a which by reason of the higher retaining force of the headed bolts 35 requires no additional securing in rotation by an axially bent-over tab engaging in the end hole 19a, similarly to the tab 33.

In the embodiment according to FIGS. 4 and 5 as retaining element there are used U-shaped springs bent from wire material. Otherwise for parts of like function in FIGS. 4 and 5 there are used reference numerals according to FIGS. 1 and 2 with the increase of the letter b. For the explanation of these parts reference is made to the description of FIGS. 1 and 2.

The U-spring used as retaining element for the connection of the diaphragm spring 7b and the presser plate 5b is designated by 41. It comprises a cross-piece region 43 guided in the slot 17b between adjacent release tongues 15b of the diaphragm spring 7b, from which region two legs 45, 47 extend radially outwards. The leg 45 extending between the presser plate 5b and the diaphragm spring 7b passes through a substantially radially extending opening 49 of the application bead 11b of the presser plate 5b. Bent-off portions 51, 53 radially on both sides of the opening 49, in relation to the rotation axis of the clutch, fix the U-spring 41 in the radial direction. The cross-piece 43 prevents rotation in other directions. The other leg 47 lies on the side of the diaphragm spring 7b axially remote from the presser plate 5b, and presses the diaphragm spring 7b resiliently against the presser plate 5b. The diaphragm spring 7b is fixed on the presser plate 5b by a plurality of U-springs 41 offset in relation to one another in the circumferential direction.

In the embodiments of the pressure plate unit as explained above the retaining elements are formed as mutually separate components which are installed individually from the side of the diaphragm spring. Embodiments are to be explained below in which the retaining elements are connected with one another into one construction unit and can be locked in common with the presser plate in one operation.

Figure 6:
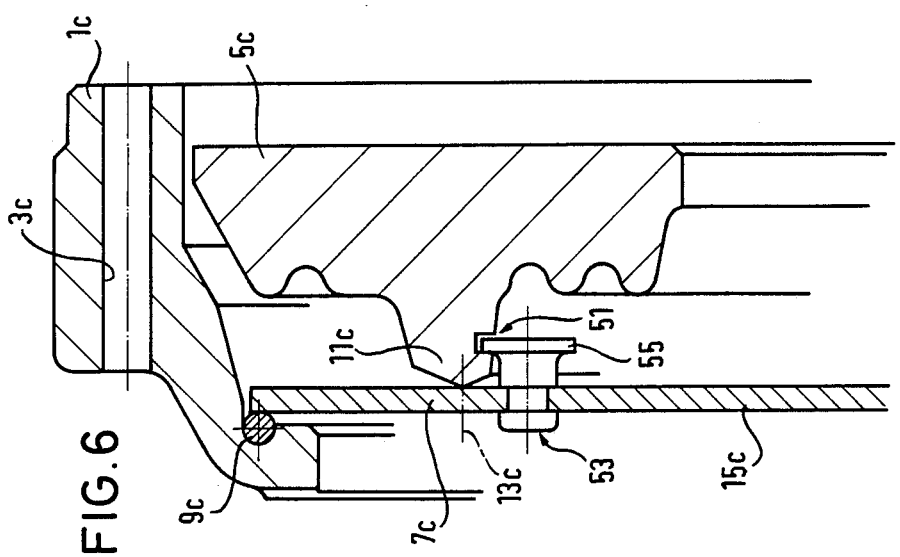
FIG. 6 shows a partial axial longitudinal section through a further pressure plate unit for a motor vehicle friction clutch, the diaphragm spring of which carries rivets for connection with a presser plate.

The pressure plate unit according to FIGS. 6 and 7 differs from the pressure plate unit according to FIGS. 1 and 2 solely in the configuration of the retaining elements. Parts of like action are therefore designated with the same reference numerals and additionally by the letter c. For the explanation of these parts reference will be made to the description of FIGS. 1 and 2.

The application bead 11c of the presser plate 5c carries on its radially inwardly directed side a circumferential groove 51 open towards the rotation axis. Radially within the circle 13c of application, rivet bolts 53 are riveted to the diaphragm spring 7c. The rivet bolts 53 protrude from the diaphragm spring 7c towards the presser plate 5c and have at their free ends a collar 55 engaging in the circumferential groove 51. At least those release tongues 15c in which rivet bolts 53 are inserted are of comparatively wide configuration in the circumferential direction: As FIG. 7 shows the application bead 11c is provided with apertures 57 open towards the diaphragm spring 7c. The apertures 57 are arranged with a spacing from one another in the circumferential direction corresponding to the mutual spacing of the rivet bolts 53. The rivet bolts 53 can be introduced by way of the apertures 57 into the groove 51 and locked with the presser plate 5c by rotation of the diaphragm spring 7c in relation to the presser plate 5c. The diaphragm spring 7c and correspondingly the diaphragm springs of the embodiments as explained above are expediently secured against twisting after installation in the clutch cover.

Figure 9:
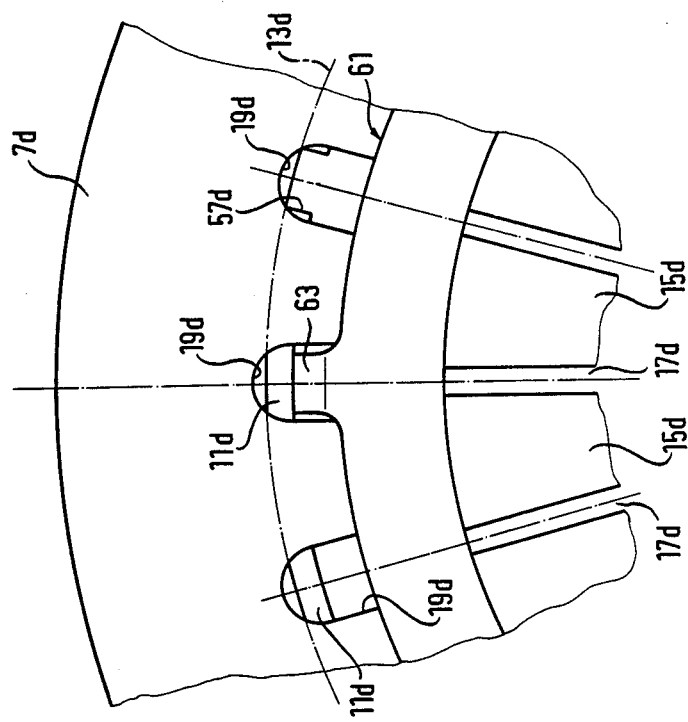
FIG. 9 shows a partial axial elevation of the pressure plate unit according to FIG. 8 with clutch cover removed.
Figure 8:
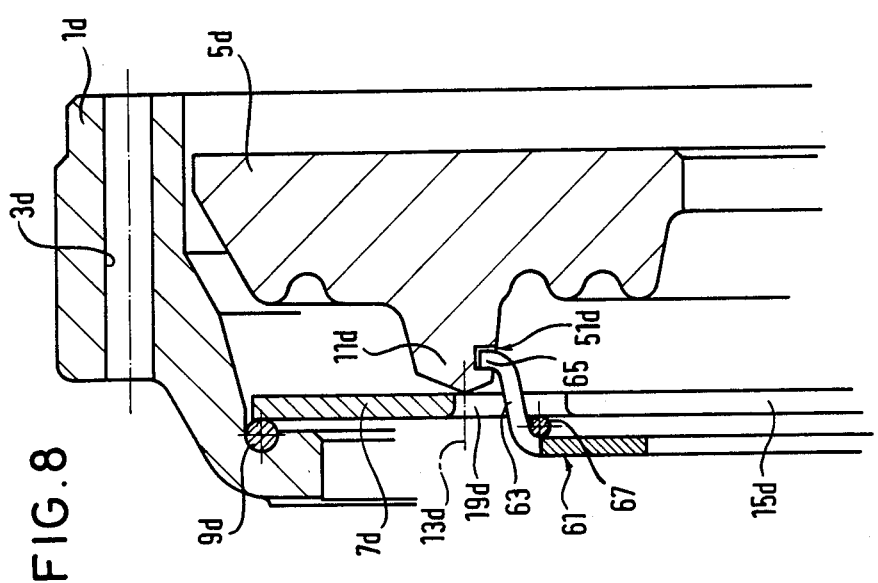
FIG. 8 shows a partial axial longitudinal section through a pressure plate unit of a motor vehicle friction clutch, the diaphragm spring of which is connected by means of a retaining ring with a presser plate.

The pressure plate unit according to FIGS. 8 and 9 differs from the pressure plate unit according to FIG. 6 only in its retaining device. Parts of like effect are provided in FIGS. 8 and 9 with the reference numerals of FIGS. 6 and 7 but with the letter d. For explanation reference is made to the description of FIGS. 1, 2, 6 and 7.

For the securing of the diaphragm spring 7d to the presser plate 5d, on the side of the diaphragm spring 7d axially remote from the presser plate 5d there is arranged an annular disc 61 from the external circumference of which several tabs 63, offset in relation to one another in the circumferential direction, protrude substantially axially away. The tabs 63 engage through end holes 19d between adjacent release tongues 15d and are bent off radially outwards in the region of their free ends 65 towards the application bead 11d of the presser plate 5d. The ends 65 engage in the circumferential groove 51d on the radially inner side of the application bead 11d. The application bead 11d is again provided with apertures 57d by way of which the ends 65 can be introduced into the circumferential groove 51d and locked with the presser plate 5d by rotation of the ring 61 and the diaphragm spring 7d in relation to the presser plate 5d. A clamping ring 67 is arranged axially between the ring 61 and the diaphragm spring 7d in the region of the external circumference of the ring 61 and resiliently initially stresses the diaphragm spring 7d against the presser plate 5d.

Figure 11:
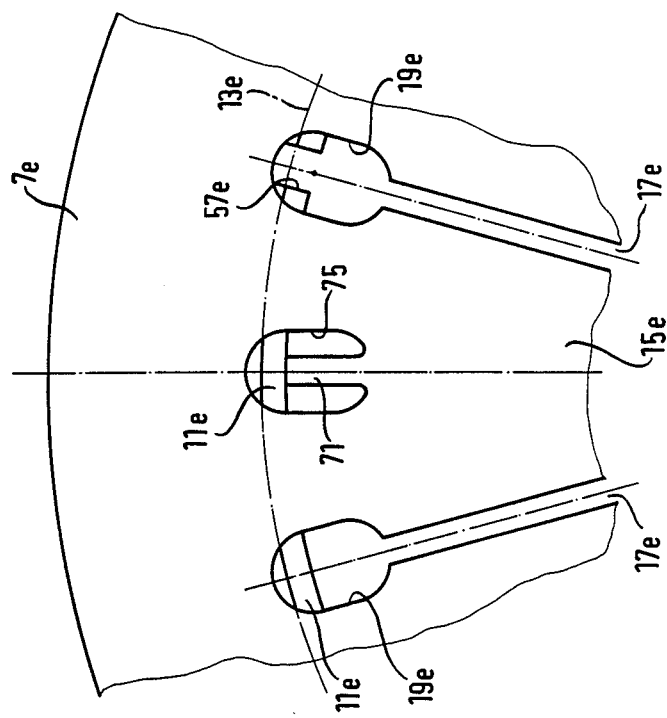
FIG. 11 shows a partial axial elevation of the pressure p unit according to FIG. 10 with clutch cover removed.
Figure 10:
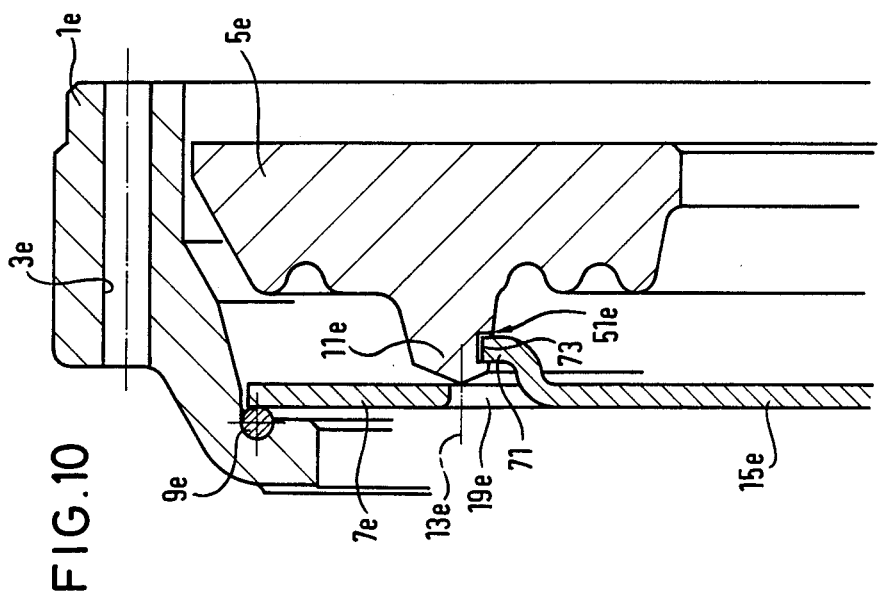
FIG. 10 shows a partial axial longitudinal section through a pressure plate unit of a motor vehicle friction clutch the diaphragm spring of which comprises tongues for connection with a presser plate.

The pressure plate unit according to FIGS. 10 and 11 likewise differs only in the configuration of its retaining device from the pressure plate unit according to FIGS. 6 and 7. Parts of like effect are designated in FIGS. 10 and 11 with the reference numerals of FIGS. 6 and 7 but with the letter e. For more detailed explanation reference is made to the description of FIGS. 1, 2, 6 and 7.

Tongues 71 are cut out of the material of the diaphragm spring 7e in the region of the application circle 13e and bent out towards the presser plate 5e. The tongues 71 engage with their ends 73 in the circumferential groove 51e provided on the radially inner side of the application bead 11e and hold the diaphragm spring 7e on the presser plate 5e. As FIG. 11 shows the tongues 71 are cut out of openings 75 which have the same form and size as the end holes 19e. The distance of the cut-out openings 75 from adjacent end holes 19e is preferably equal to the distance between immediately adjacent end holes 19e. The application bead 11e again has an introduction aperture 57e by way of which the tongues 71 can be introduced into the circumferential groove 51e and locked with the presser plate 5e by rotation of the diaphragm spring 7e in relation to the presser plate 5e.

While specific embodiments of the invention have been shown and described in detail to illustrate the application of the inventive principles, it will be understood that the invention may be embodied otherwise without departing from such principles.

We claim:

1. A pressure plate unit for a pulled-type friction clutch, comprising:
    (a) an annular clutch cover which defines a clutch rotation axis,
    (b) an annular presser plate movable axially in relation to the clutch cover,
    (c) a diaphragm spring of substantially annular disc form which is supported on it side axially remote from the presser plate along its external circumference on the clutch cover and radially within its external circumference along a circle of application on the presser plate,
    (d) retaining means securing the presser plate on the diaphragm spring having a plurality of retaining elements extending axially within the circle of application from the diaphragm spring to the presser plate, each of said elements engaging with a first end adjacent to the presser plate in an aperture of the presser plate and each of said retaining elements being fixed non-rotatably on at least one of the diaphragm spring and the presser plate, the diaphragm spring comprises in the region of the circle of application a plurality of holes offset in relation to one another in the circumferential direction and the presser plate comprises a plurality of threaded openings with axes parallel to the rotation axes and aligned axially each with one of the holes, and wherein the retaining elements are formed as threaded bolts which reach through the holes of the diaphragm spring and are screwed by the first end, each into one of the threaded openings, said threaded bolts each having a second end carrying a separate leaf spring element which abuts resiliently on the diaphragm spring axially remote from the presser plate, each threaded bolt carries a head at its second end and passes through a distance sleeve, said leaf spring element separate from said distance sleeve being clamped in between the distance sleeve and the head, each leaf spring element is of U-form and comprises a cross-piece region secured to the second end of one of the threaded bolt and two spring tongues protruding substantially radially outwardly in relation to the clutch rotation axis from the cross-piece, said spring tongues abutting on the diaphragm spring.

* * * * *